United States Patent [11] 3,607,350

[72] Inventor Richard J. Rathsack
Midland, Mich.
[21] Appl. No. 687,988
[22] Filed Dec. 5, 1967
[45] Patented Sept. 21, 1971
[73] Assignee The Dow Chemical Company
Midland, Mich.

[54] ELECTROLESS PLATING OF PLASTICS
9 Claims, No Drawings

[52] U.S. Cl. .......... 117/47 A, 117/160 R, 204/30, 260/79.3
[51] Int. Cl. .......... B44d 1/092, C23c 3/02
[50] Field of Search .......... 117/47 R, 160; 260/79.3; 204/30

[56] References Cited

UNITED STATES PATENTS

| | | | |
|---|---|---|---|
| 2,821,522 | 1/1958 | Bauman et al. | 260/79.3 |
| 2,783,137 | 2/1957 | Roth | 260/79.3 X |
| 2,836,578 | 5/1958 | Teot | 260/79.3 |
| 3,035,944 | 5/1962 | Sher et al. | 117/47 R |
| 3,222,218 | 12/1965 | Beltzer et al. | 117/47 R |
| 3,326,866 | 6/1967 | Haag | 260/79.3 |
| 2,728,831 | 12/1955 | Pope | 260/79.3 X |

*Primary Examiner*—Alfred L. Leavitt
*Assistant Examiner*—Janyce A. Bell
*Attorneys*—Griswold and Burdick, Lester J. Dankert and Benjamin G. Colley

ABSTRACT: An organic plastic substrate is metal plated by the following essential steps (1) sulfonation with $SO_3$ in a chlorinated hydrocarbon solvent, (2) neutralization of the sulfonated plastic in a dilute alkaline aqueous solution of an alkali compound, (3) immersing the neutralized, sulfonated plastic in a basic solution of silver nitrate and (4) coating a thin coat of copper or nickel on the activated, sulfonated plastic by means of a conventional electroless plating bath.

ELECTROLESS PLATING OF PLASTICS

This invention relates to a process for the plating of organic plastic substrates. In particular, this invention relates to the electroless or chemical plating of organic polymeric surfaces and specifically to the preconditioning of the polymer substrate so that the subsequent metallic coating is firmly adhered to such substrate.

Various methods are known for the metallization of organic plastics such as vacuum vaporization, cathode sputtering, and the silver spray methods. The method called "electroless plating" was invented by Dr. Abner Brenner of the National Bureau of Standards. This process is more correctly termed the autocatalytic reduction process since the noble metal on the substrate decomposes the aqueous plating solution, i.e. the electroless plating bath, to deposit a uniform film of metal such as copper or nickel on the substrate. Recently much activity has been generated in the field due to the development of good electroless plating baths and to the recognition that the adhesion of the metal coat is directly related to the etching conditions applied to the substrate. See, for example, the article by C. C. Weekly "Plating" vol. 53, ① 1, pages 107 -109 (Jan. 1966).

It is known that nonmetallic bodies can be treated to give the surface ion-exchange properties by treatment with concentrated sulfuric acid or phosphoric acid, further treated with a noble metal salt solution i.e. basic silver nitrate and then copper plated by immersion in an alkaline copper solution.

The present invention comprises the discovery that the tendency of the sulfonated substrate to destroy the basic noble metal salt solution in the process just mentioned can be eliminated by treatment or neutralization of the sulfonated substrate with an alkaline aqueous solution of an alkali compound.

It has also been discovered that this neutralization step gives plating runs which are more uniform with respect to electroless deposition and coating of the substrate.

Still further, it has been discovered that the neutralization step provides a barrier coating in the form of alkali sulfonate groups which has the unique property of partially retaining some of the chlorinated solvent in the surface of the swelled and sulfonated substrate and protecting it against excessive detrimental oxidation for a period of time in the order of 3 days. This barrier coating is believed to inhibit the evaporation of the solvent swelled substrate and thus the subsequent plating steps can be delayed with no substantial loss in adhesion or plating uniformity. This permits delay of immediate electroless plating after sulfonation and would allow the sulfonated substrate to be shipped to a plating facility.

It is an object of this invention to etch the surface of various polymers and to create chemically reactive sites on the polymers so as to make the surface suitable for the reception of noble metals upon which a base metal coating is subsequently deposited.

It is a further object of this invention to provide the art with a process which extends the life of the noble metal bath.

A still further object of this invention is to provide the art with a process which gives more uniformity to the plating runs.

Another object of this invention is to provide the art with a process which is more flexible and convenient in that the plastic substrate does not have to be plated immediately after it is sulfonated and can be stored, shipped or sold as an article of commerce.

The foregoing objects are achieved in this process by the steps of:

1. contacting the organic plastic substrate with a solution of sulfur trioxide in a low molecular weight chlorinated hydrocarbon solvent,
2. washing with water,
3. contacting the sulfonated plastic in a dilute alkaline aqueous solution of an alkali compound,
4. washing again with water,
5. immersing the alkali sulfonated plastic in a basic aqueous solution of silver nitrate,
6. washing again with water and
7. plating a coat of metal on the substrate by means of a conventional electroless plating bath such as a electroless copper or electroless nickel plating bath.

The range of organic plastic substrates to which this invention is applicable is very broad. Any solid, natural or synthetic plastic substrate having a replaceable hydrogen atom bonded to a carbon atom can be used as a substrate. Nonlimiting examples of these are cellulose esters, polyalkyl acrylates, polyvinyl halides, polyvinyl esters, melamine resins, poly $\alpha$-olefins, polystyrene, polyamides such as nylon, acrylonitrile-butadiene-styrene (ABS) copolymers, phenol formaldehyde resins, epoxy resins, styrene-acrylonitrile (SAN) copolymers, ureaformaldehyde resins, polyesters such as Mylar, and blends of the foregoing can be used in this process. The only requirement of the plastic substrate is that it have a replaceable hydrogen atom attached to a carbon atom so that upon sulfonation the sulfonate group is chemically bonded to the carbon atom.

The low molecular weight chlorinated hydrocarbon solvents which have been found useful in the sulfonation step are carbon tetrachloride, methylene chloride, tetrachloro ethylene, ethylene chloride, chloroform, perchloroethylene and mixtures thereof. The preferred solvents are carbon tetrachloride, tetrachloroethylene, methylene chloride and mixtures thereof since these are more resistant to attack by sulfur trioxide.

The concentration of the sulfur trioxide in the solvent can vary from about 0.1 percent to about 10 percent by weight. The preferred concentration is in the range from 2.5 to 4.0 weight percent.

The temperature at which the sulfonation reaction takes place is not critical and can vary from −10° to 45° C. with 20° to 30° C. being the preferred range.

The length of time that the plastic substrate is in contact with the sulfur trioxide solution is a variable factor depending upon the concentration of the sulfur trioxide and the temperature. Generally, in the preferred temperature range and at the preferred concentrations the contact time can vary from 5 seconds to 10 minutes. A preferred contact time is in the range of 10 to 30 seconds with a sulfur trioxide concentration of 3.2 percent by weight in the inert diluent. Longer periods of contact with stronger concentrations are to be avoided since the plastic will be browned or blackened and the excess sulfonation contributes nothing to the quality of the final product. On the other hand, when one operates with shorter periods of contact or lower concentrations than those suggested above, the sulfonation is incomplete and the resulting metallic plating has poor adhesion to the substrate or is nonuniform.

Following the sulfonation step, the plastic substrate is washed with water to prevent or reduce the contamination in the following steps. It is to be understood that distilled water or deionized water is preferred. However, in most cases tap water is acceptable.

After the washing step, the sulfonated plastic is immersed in a dilute alkaline aqueous solution of an alkali compound. The purpose of this step is to convert the sulfonic acid groups bonded on the plastic surface to the corresponding alkali metal salts and neutralize any excess acid anhydride on the surface (i.e. free $SO_3$). The dilute alkaline aqueous solutions of alkali compounds that can be used are generally a strong base or an alkali salt of a weak acid. Specific but nonlimiting examples of these are sodium hydroxide, sodium carbonate, sodium bicarbonate, sodium citrate, sodium acetate, etc. The corresponding ammonium, potassium and lithium salts are also operable in this process, however, the sodium salts are preferred since they are generally cheaper and readily available.

The concentration of these solutions can vary from about 0.1 to about 20 weight percent of the alkali compound based on the water. The contact time can vary from 10 seconds to 5 minutes with 0.5 minutes being the preferred time. The temperature range for this step can be the same as that of the sulfonation step.

After the neutralization step, the treated plastic substrate is again washed with water to remove the excess alkali compound.

The neutralized, sulfonated plastic is then immersed in a basic silver nitrate solution. An ammoniacal solution of silver nitrate having about 0.2 percent to about 10 per cent by weight of silver nitrate is preferred. However, slightly higher and lower amounts are operative. The solutions are made basic by the addition of 1 to 4 weight percent of ammonium hydroxide. In this step, the contact time can vary in the range from 0.5 to 10 minutes with 1 to 3 minutes being the preferred contact time. At a temperature in the range of from about 20° to 30° C. this step is believed to result in the replacement of all or substantially all of the alkali ions with silver ions.

The next step of the process consists of plating a thin coating of nickel or copper on the above treated plastic. The coating can range in thickness from a monomolecular film to 0.5 mils. Any one of a number of commercial electroless plating baths may be used. Examples of these are "Cuposit Copper Mix 99" sold by the Shipley Co. Inc. Newton, Mass.; "Enplate DU–400"sold by Enthone, Inc. New Haven, Conn.; and "-Macuplex Chemical Nickel" sold by Mac Dermid Inc. Ferndale, Mich. Patents which disclose the compositions of other electroless plating baths are Tsu et al. 3,212,917, Sallo 3,265,511 and Ehrhardt 3,307,972. The disclosures of these patents are incorporated herein by reference. The details of this step such as contact time and temperature are well known to those skilled in the art especially in view of the above patents and the literature on this subject such as W. Goldie, "Electroplating and Metal Finishing" pages 4 –7, 19, Jan. 1966 and page 49, Feb. 1966.

By following the above steps, an adherent base coat of metal to the plastic substrate is achieved. This base coat is then used as an electrode in a conventional electroplating bath to build up the desired metal coating. After the base coat is applied, any other metal can be electrodeposited by conventional electroplating means on the now conductive plastic. In this manner, this process is useful to make metallized parts for radios, automobiles and appliances which are attractive, cheap and durable.

The following didactic examples are presented solely to illustrate the invention and are not to be construed in any way as imposing a limit on the scope of the invention. Unless otherwise indicated, all parts and percentages are to be taken by weight.

EXAMPLE 1

A 60 mil sample (4 ×7 inches) of polypropylene having a specific gravity of 0.905 as measured by ASTM D-792 –50 and a melt flow of 12 gms per 10 minutes as measured by ASTM D-1238 -62 T (condition L) was immersed for 5 minutes in a bath of methylene chloride containing 3.2 percent of sulfur trioxide at 25° C. The sample was then rinsed with deionized water and neutralized by immersion in a 1 percent solution of sodium bicarbonate in water. The sample was further rinsed with deionized water. After being transferred to a plating facility, it was immersed in an ammoniacal silver nitrate bath of a concentration of 10 percent for 1 minute, rinsed with deionized water and immersed in an Enthone electroless copper plating solution (Enplate DU-400 ). The electrolessly plated sample was then electroplated by conventional means to build up a layer of copper of about 5 mils thickness. Good uniformity of the plating was observed with good adhesion to the substrate.

EXAMPLE 2

A 4 ×7 inch sample of 60 mil linear polyethylene (density 0.967, melt index 6 gms per 10 minutes ASTM D-1238 -62 T condition E) was immersed for one minute in a bath of methylene chloride containing 3.2 percent of sulfur trioxide at 25° C. The sample was rinsed with deionized water, neutralized, and plated as in Example 1. Again a uniform plating was observed with good adhesion.

EXAMPLE 3

The procedure of Example 1 was applied to a 4 ×7 inch 60 mil sample of low density, highly branched polyethylene of a melt index of 8 gms per 10 minutes (ASTM D-1238 -62 T; condition E) and a density of 0.926. The sample was observed to be uniformly plated with no imperfections. Adhesion was equal to or superior to that of the foregoing examples.

EXAMPLE 4

A 4 ×7 inch sample of 60 mil styrene-acrylonitrile copolymer having a melt flow of 11 gms per 10 minutes as measured by ASTM D-1238 -62 T, condition I; a specific gravity of 1.08 as measured by ASTM D-792 -60 T, and a tensile strength of 9,500 lb. f per square inch as measured by ASTM D- 638 -61 T was sulfonated by immersion in a carbon tetrachloride bath containing 2.5 percent sulfur trioxide for 1 minute at 25° C. The sample was then neutralized and plated by the procedure of Example 1. The uniformity and adhesion of the plating were good.

By following the above examples, equally good results are obtained with other synthetic or natural resins or plastics so long as they are capable of undergoing sulfonation, i.e. have a replaceable hydrogen atom bonded to a carbon atom. Likewise, in the above examples, substitution of a nickel electroless plating bath provides similar results.

I claim:

1. A method of chemically depositing a metal of the group consisting of nickel and copper on the surface of an organic plastic substrate which comprises the steps of:

a. momentarily contacting said substrate surface with a solution of sulfur trioxide in a low molecular weight chlorinated hydrocarbon solvent to sulfonate said substitute,
b. washing the resulting treated surface with water,
c. neutralizing the so sulfonated plastic substrate by momentarily contacting the resulting treated surface with a dilute alkaline aqueous solution of an alkali compound,
d. washing the resulting treated surface with water,
e. immersing the resulting surface-treated and washed substrate in a basic aqueous solution of silver nitrate,
f. washing the resulting treated surface with water and
g. immersing the resulting treated and washed substrate in a suitable electroless plating bath whereby a metallic coating is deposited on said plastic substrate.

2. The method of claim 1 in which the concentration of sulfur trioxide in the chlorinated solvent is about 0.1 to about 10 percent by weight.

3. The method of claim 2 in which the chlorinated hydrocarbon solvent is selected from the group consisting of carbon tetrachloride, tetrachloroethylene, methylene chloride and mixtures thereof.

4. The method of claim 1 in which the chlorinated hydrocarbon solvent is methylene chloride and the concentration of sulfur trioxide in said solvent is 2.5 to 4.0 percent by weight.

5. The method of claim 1 in which the dilute alkaline aqueous solution of an alkali compound has a concentration of about 0.1 to about 20 weight percent of the alkali compound.

6. The method of claim 5 in which the alkali compound is an alkali metal salt of a weak acid.

7. The method of claim 5 in which the alkali compound is a strong base.

8. The method of claim 5 in which the alkali compound is sodium bicarbonate.

9. The method of claim 1 in which the basic aqueous solution of silver nitrate contains about 0.2 to about 10 percent by weight of silver nitrate and about 1.0 to 4.0 percent by weight of ammonium hydroxide.